(12) United States Patent
Rockwell, Jr. et al.

(10) Patent No.: US 6,296,919 B1
(45) Date of Patent: *Oct. 2, 2001

(54) CUSHIONED CARPETED FLOOR MAT WITH AT LEAST ONE CUSHIONING INTEGRATED RUBBER PROTRUSION

(75) Inventors: James N. Rockwell, Jr.; Robert C. Kerr; William O. Burke, III, all of LaGrange, GA (US)

(73) Assignee: Milliken & Company, Spartanburg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/374,321

(22) Filed: Aug. 13, 1999

(51) Int. Cl.[7] ............................. B32B 3/02; B32B 33/00; D04H 11/00
(52) U.S. Cl. ................................. 428/85; 428/86; 428/87; 428/88; 428/89; 428/90; 428/91; 428/92; 428/93; 428/94; 428/95; 428/96; 428/97; 428/319.3; 15/215; 15/216
(58) Field of Search .................................. 428/85, 86, 87, 428/88, 89, 90, 91, 92, 93, 94, 95, 96, 97, 319.3; 15/215, 216

(56) References Cited

U.S. PATENT DOCUMENTS

| 1,008,618 | 11/1911 | Skowronski et al. | |
|---|---|---|---|
| 3,016,317 | 1/1962 | Brunner | 154/49 |
| 4,045,605 | 8/1977 | Breens et al. | 428/88 |
| 4,262,048 | 4/1981 | Mitchell | 428/99 |
| 4,353,944 | 10/1982 | Tarui | 428/74 |
| 4,439,475 | * 3/1984 | Lang | 428/92 |
| 4,465,720 | * 8/1984 | Bell et al. | 428/85 |
| 4,587,148 | 5/1986 | Campbell et al. | 428/88 |
| 4,711,191 | 12/1987 | Schwartz | 112/410 |
| 4,741,065 | 5/1988 | Parkins | 15/217 |
| 4,820,566 | 4/1989 | Heine et al. | 428/88 |
| 4,886,692 | 12/1989 | Kerr et al. | 428/82 |

(List continued on next page.)

FOREIGN PATENT DOCUMENTS

| 614853 | 7/1976 | (CH) . | |
|---|---|---|---|
| 0 325 040 | * 1/1990 | (EP) | A47G/27/04 |
| 0 351 041 | * 1/1990 | (EP) | A47G/27/02 |
| 1211755 | 10/1959 | (FR) . | |
| 2-112437 | 4/1990 | (JP) . | |
| WO 95/30040 | 11/1995 | (WO) . | |
| WO 96/37645 | 11/1996 | (WO) . | |

*Primary Examiner*—Terrel Morris
*Assistant Examiner*—Arti R. Singh
(74) *Attorney, Agent, or Firm*—Terry T. Moyer; William S. Parks

(57) ABSTRACT

This invention relates to a cushioned floor covering article wherein the mat includes a tufted carpet placed on the top side of a foam rubber sheet and at least one foam rubber protrusion integrated within at least a portion of the bottom side of the foam rubber sheet. Such an article provides effective removal of moisture, dirt, and debris from the footwear of pedestrians through the utilization of a carpet pile component. Furthermore, the utilization of a foam rubber backing also allows for either periodic heavy duty industrial-scale laundering in such standard washing machines or periodic washing and drying in standard in-home machines, both without appreciably damaging the inventive floor covering article, such as a floor mat. Additionally, the presence of integrated foam rubber protrusions within the mat structure provides an effective cushioning effect for pedestrian comfort as well as a means to prevent slippage of the article from its contacted surface. A method of producing such an inventive cushioned floor covering article is also provided.

9 Claims, 2 Drawing Sheets

U.S. PATENT DOCUMENTS

| | | | |
|---|---|---|---|
| 5,055,333 | 10/1991 | Heine et al. | 428/88 |
| 5,170,526 * | 12/1992 | Murray | 15/215 |
| 5,171,619 * | 12/1992 | Reuben | 428/95 |
| 5,227,214 | 7/1993 | Kerr et al. | 428/95 |
| 5,305,565 | 4/1994 | Nagahama et al. | 52/177 |
| 5,645,914 | 7/1997 | Horowitz | 428/81 |
| 5,902,662 | 5/1999 | Kerr | 428/95 |
| 5,928,446 | 7/1999 | Rockwell, Jr. et al. | 156/72 |
| 5,932,317 | 8/1999 | Kerr | 428/192 |

* cited by examiner

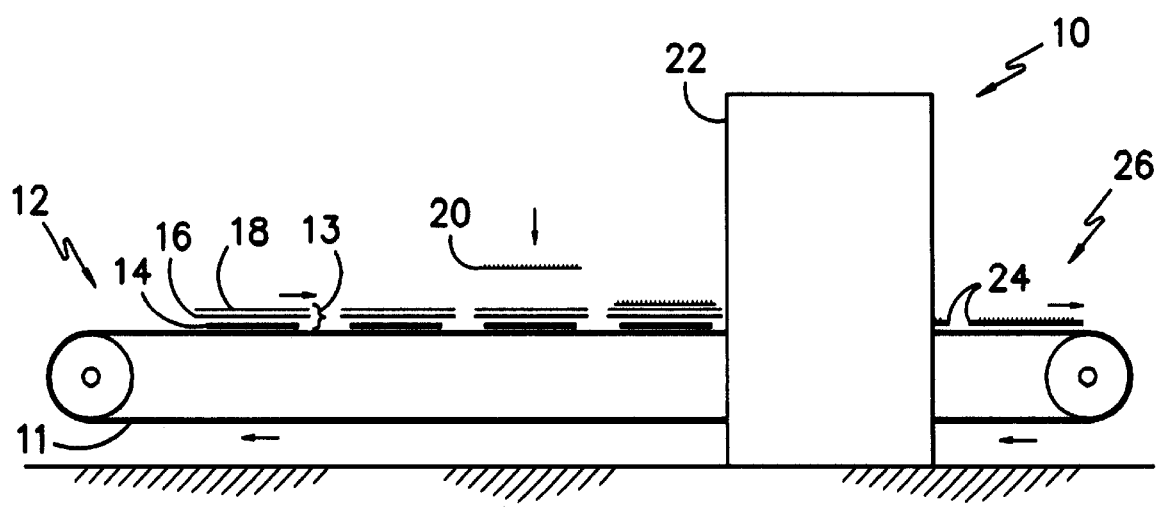
FIG. -1-
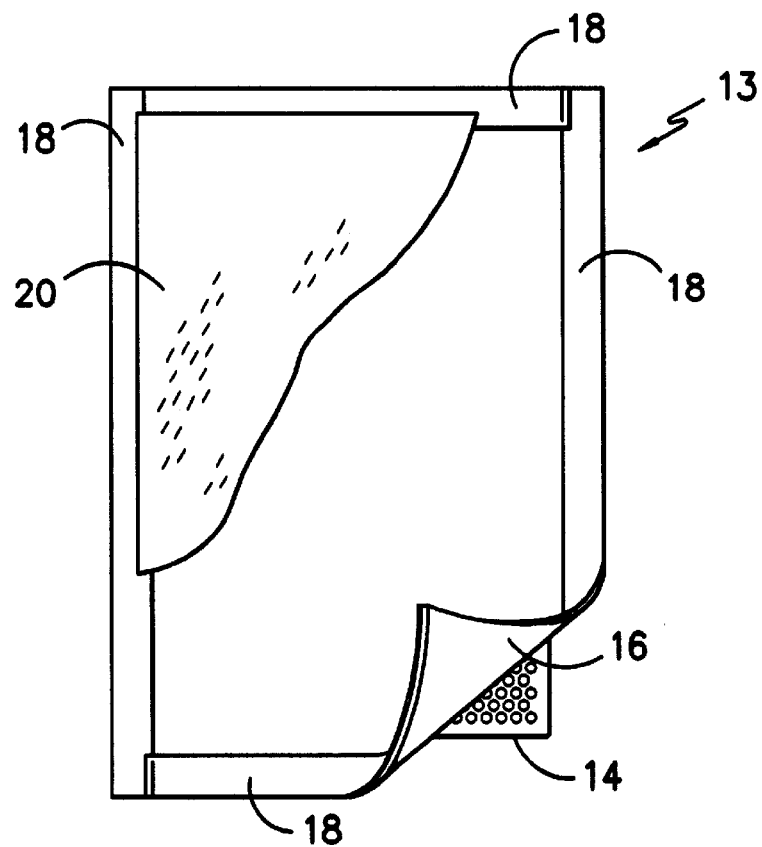
FIG. -2-

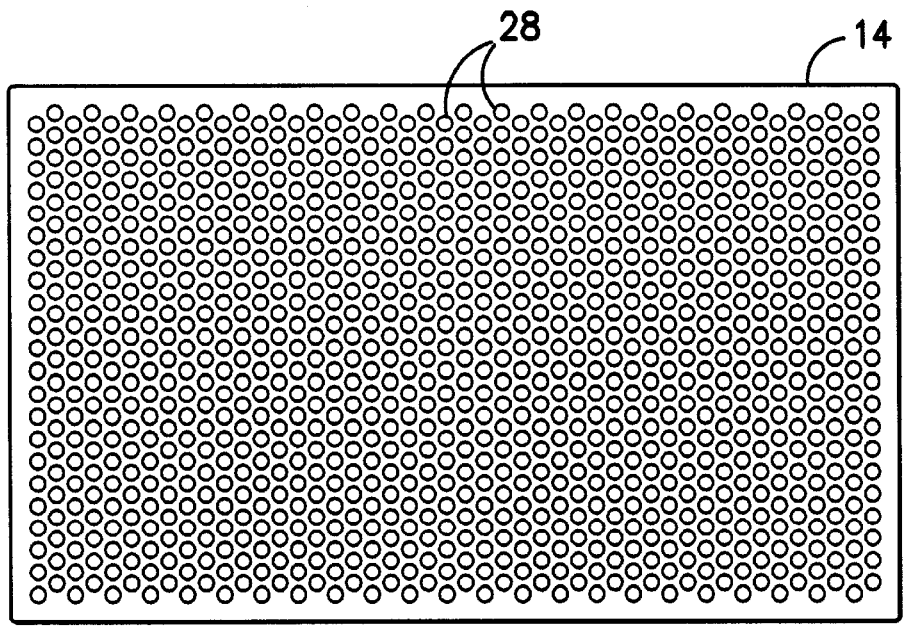
FIG. -3-
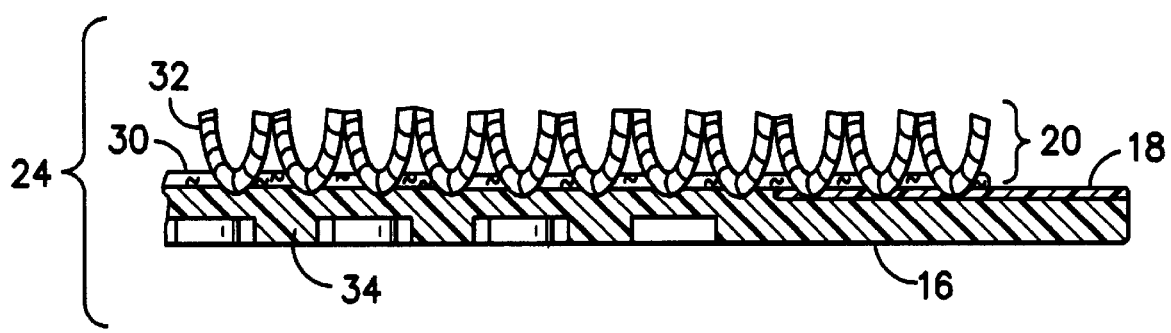
FIG. -4-

CUSHIONED CARPETED FLOOR MAT WITH AT LEAST ONE CUSHIONING INTEGRATED RUBBER PROTRUSION

FIELD OF THE INVENTION

This invention relates to a cushioned floor covering article wherein the mat includes a tufted carpet placed on the top side of a foam rubber sheet and at least one foam rubber protrusion integrated within at least a portion of the bottom side of the foam rubber sheet. Such an article provides effective removal of moisture, dirt, and debris from the footwear of pedestrians through the utilization of a carpet pile component. Furthermore, the utilization of a foam rubber backing also allows for either periodic heavy duty industrial-scale laundering in such standard washing machines or periodic washing and drying in standard in-home machines, both without appreciably damaging the inventive floor covering article, such as a floor mat. Additionally, the presence of integrated foam rubber protrusions within the mat structure provides an effective cushioning effect for pedestrian comfort as well as a means to prevent slippage of the article from its contacted surface. A method of producing such an inventive cushioned floor covering article is also provided.

DISCUSSION OF THE PRIOR ART

All U.S. patent cited herein are hereby fully incorporated by reference.

Floor mats have long been utilized to facilitate the cleaning of the bottoms of people's shoes, particularly in areas of high pedestrian traffic such as doorways. Moisture, dirt, and debris from out of doors easily adhere to such footwear, particularly in inclement weather and particularly in areas of grass or mud or the like. Such unwanted and potentially floor staining or dirtying articles need to be removed from a person's footwear prior to entry indoors. As will be appreciated, such outdoor mats by their nature must undergo frequent repeated washings and dryings so as to remove the dirt and debris deposited thereon during use. These mats are generally rented from service entities which retrieve the soiled mats from the user and provide clean replacement mats on a frequent basis. The soiled mats are thereafter cleaned and dried in an industrial laundering process (such as within rotary washing and drying machines, for example) and then sent to another user in replacement of newly soiled mats. Furthermore, it is generally necessary from a health standpoint to produce floor coverings on which persons may stand for appreciable amounts of time which will provide comfort to such persons to substantially lower the potential for fatigue of such persons by reducing the stress on feet and leg joints through cushioning.

Typical carpeted dust control mats comprise solid and/or foam rubber backing sheets which must be cleated in some manner to prevent slippage of the mat from its designated area. Such cleats are formed during a vulcanization step and have required a time-consuming procedure of placing the green (unvulcanized) rubber sheet on a molded silicone pad and then removing the same after vulcanization. Also, the thicknesses of such dust control rubber backing sheets are generally quite low and thus permit the placement of a pedestrian's foot relatively close to the covered floor or ground when he steps on such a mat. As a result, and particularly if the covered area is hard, the mat does not appreciably cushion the pedestrian's foot. With a general shift toward providing protection to pedestrians, particularly outside entryways of stores, where a cushioned, non-slip dust control mat will provide a safe, comfortable floor covering on which a customer may clean his footwear, and workplaces, where a person may be required to be mobile for an appreciable amount of time during the workday and thus a non-slip, cushioned floor covering provides a certain degree of safety to a user, there is a recognized need to provide non-slip floor and/or ground coverings which can potentially reduce the stress of a pedestrian's leg and foot joints through the benefit of cushioning characteristics. There have been a few advancements within the prior art for providing cushioning within dust control mats, such as U.S. Pat. No. 5,645,914 to Horowitz. Generally, such cushioning benefits are provided in either only all-rubber mats, as in U.S. Pat. No. 3,016,317 to Brunner, or solely provide such cushioning benefits within or on the top side of the mat, as in U.S. Pat. No. 4,262,048 to Mitchell. Also, cleated backings have been produced in the past to provide non-slip characteristics, such as in U.S. Pat. No. 4,741,065 to Parkins. Such mats do not also provide cushioning characteristics with the same non-slip components, however. As such, there still exists a need to reduce cost for producing overall dust control mat products through a process wherein the cushioning characteristics are simultaneously provided by the same non-slip mechanism. To date, the prior art has neither taught nor fairly suggested such a combination of elements in a cushioned carpeted floor covering article.

DESCRIPTION OF THE INVENTION

It is thus an object of this invention to provide a non-slip, cushioned, anti-fatigue carpeted floor covering article which permits cleaning of a pedestrian's footwear. Furthermore, it is an object of the invention to provide a carpeted floor covering article for which the portion which provides the cushioning characteristics simultaneously provides non-slip benefits. An additional object of this invention is to provide a non-slip, cushioned, antifatigue carpeted floor covering article in which the cushioning aspects are provided by at least one integrated rubber protrusion produced during the necessary vulcanization process. Still a further object of the invention is to provide a non-slip, cushioned carpeted floor covering article which possesses sufficient flexibility to withstand periodical laundering in industrial washing and drying machines. Yet another object of this invention is to provide a floor covering article which can substantially reduce a person's fatigue after standing on such an article for appreciable periods of time as compared with other standard floor covering articles.

Accordingly, this invention encompasses a cushioned floor covering article comprising
  a carrier fabric;
  a pile material tufted into the carrier fabric which forms a pile surface on one side of the carrier fabric; and
  a vulcanized expanded backing sheet of rubber attached to the other side of the carrier fabric, wherein at least one protrusion integrated within said backing sheet is present on the side of the backing opposite the side to which the carrier fabric is attached. Also, this invention encompasses a method of forming a cushioned floor covering article comprising the steps of
  (a) placing a sheet of rubber over a die having at least a first and second side, wherein said rubber optionally comprises a blowing agent to form a closed-cell foam rubber structure upon vulcanization, wherein said die has portions thereof removed to allow for the entry of molten rubber, and wherein said die is comprised of a material which can withstand vulcanization temperatures and pressures;

(b) tufting a pile material into a carrier fabric to form a tufted pile surface extending from one side of the carrier fabric;

(c) laying the carrier fabric with tufted pile onto the rubber sheet of step "a";

(d) optionally, placing solid rubber reinforcing strips around at least one of the border edges of the rubber sheet; and (e) subjecting the composite comprising the rubber sheet, the die, the carrier fabric, the carpet pile, and the optional reinforcing strips to vulcanization temperatures and pressures to (1) attach the rubber sheet to the side of the carrier fabric from which the pile surface does not extend, and (2) to form rubber protrusions through the removed portions of the die.

The inventive dust control mat generally comprises any type of standard carpet pile fibers tufted through any standard type of carrier fabric. Such carpet fibers may be natural or synthetic, including, without limitation, cotton, ramie, wool, polyester, nylon, polypropylene, and the like, as well as blends of such fibers (all as merely examples). The fibers may be coarse or fine in structure as well. Such fiber structures are represented in dust control mats within U.S. Pat. No. 1,008,618, to Skowronski et al., U.S. Pat. No. 4,045,605, to Breens et al., and U.S. Pat. No. 4,353,944, to Tarui, U.S. Pat. Nos. 4,820,566 and 5,055,333, both to Heine et al., as well as within French Patent No. 1,211,755, assigned to Cosyntex (S.A.), and PCT Application 95/30040, assigned to Kleen-Tex Industries, Inc. Of particular interest in this invention, however, are 100% solution dyed nylon fibers. Such pile fibers provide the best pile surface for overprinting with different dyes in order to provide the most aesthetically pleasing colorations and shades on the floor mat pile surface. The carrier fabric may thus be of any construction, such as woven, non-woven, knit, and the like. Preferably, a woven or non-woven substrate is utilized. The carpet pile is tufted through the carrier fabric in a standard tufting process for further placement on and attachment during vulcanization to the top side of the rubber backing sheet.

The carpet fibers may be colored or dyed through any acceptable method so as to produce aesthetically pleasing designs within the carpet pile portion of the inventive mat. Of particular importance, however, is the utilization of an overprinting procedure of 100% solution dyed nylon fibers. Such nylon is acid-dyeable and available from Cookson Fibers. As noted above, such pile fibers allow for the most pleasing and long-lasting colorations and shades of color to be applied and retained on the pile surface through the utilization of acid dyes. With such fibers, any design or configuration may be produced (as well as logos, pictures, and the like) on the pile surface, again in order to provide a long-lasting aesthetically pleasing floor mat for the consumer. Furthermore, the inventive article itself can be made in any shape, with rectangular or square configurations being preferred.

In actuality, the attachment of the rubber sheet component to the carpet pile fibers may be accomplished either during the actual vulcanization step, as taught in Nagahama, for example, above, or through the use of an adhesive layer, preferably a polyolefin adhesive, between the carpet pile and the rubber sheet, as disclosed in copending U.S. patent application Ser. No. 08/732,866, to Kerr, hereby entirely incorporated by reference, or any other like procedure.

The rubber backing sheet may be comprised of any standard rubber composition, including, but not limited to, acrylonitrile-butadiene rubber (NBR), styrene-butadiene rubber (SBR), ethylene--propylene-diene comonomer rubber (EPDM), carboxylated NBR, carboxylated SBR, chlorinated rubber, silicon-containing rubber, and the like. For cost purposes, the preferred rubbers are NBR, SBR, EPDM and blends thereof.

The rubber composition may be of solid or foam construction or there may be layers of both present on the inventive mat. Preferably, the majority of the rubber composition within the backing sheet is of foam construction (which requires the presence of a blowing agent to form closed-cell structures within the rubber upon vulcanization, such as in U.S. Pat. No. 5,305,565 to Nagahama et al.). The target thickness for such a rubber sheet is from about 5 to about 500 mils, preferably from about 25 to about 400 mils, more preferably from about 40 to about 250 mils, and most preferably from about 75 to about 200 mils.

Floor mats and other like floor covering articles have exhibited general problems arising from frequent washings and harsh environments of use. First, the energy required to wash and dry a typical floor mat is significant due to the overall mass of the mats. This overall mass is made up of the mass of the mat pile, the mass of the carrier fabric into which the mat pile is tufted, and most significantly, the mass of the rubber backing sheet which is integrated to the carrier fabric under heat and pressure. As will be appreciated, a reduction in the overall mass of the floor mat will result in a reduced energy requirement in washing and drying the mat. Moreover, a relative reduction in the mass of the rubber backing sheet (i.e. the heaviest component) will provide the most substantial benefit. Thus, the utilization of a lighter weight rubber composition, such as foam rubber, in at least a portion of the dust control mat of the present invention includes a rubber backing sheet which may possess a specific gravity which is approximately 25–35 percent less then the solid rubber sheets of typical prior floor mats. Accordingly, a foam rubber is preferable, though not required, as the rubber structure of the inventive mat's rubber backing sheet. This lighter weight thus translates into a reduced possibility of the mat harming either the washing or drying machine in which the mat is cleaned, or the mat being harmed itself during such rigorous procedures. Although the inventive floor mat must withstand the rigors of industrial machine washing, hand washing and any other manner of cleaning may also be utilized. Overall, the inventive floor mat provides an article which will retain its aesthetically pleasing characteristics over a long period of time and which thereby translates into reduced costs for the consumer.

Solid rubber reinforcement strips may also be added around the borders of the mat, either by hand or in an in-line process, such as in Patent Cooperation Treaty Application 96/38298, to Milliken Research Corporation. Such strips must either possess roughly the same shrinkage rate factor as the carpet pile substrate and the foam rubber backing sheet or they must possess roughly the same modulus strength of the solid rubber backing sheet, all in order to ensure the probability of rippling (or curling) of the mat will be minimal. Such strips may be comprised of any type of butadiene rubber, such as acrylonitrile-butadiene (NBR) or styrene-butadiene (SBR), or carboxylated derivatives of such butadienes, merely as examples. Preferably, the strips are comprised of NBR as carboxylated NBR is cost prohibitive. Such strips can be of any general width and as long as the specific side upon which they are attached on the backing sheet. The target thickness for such strips second layer is from about 2 to about 50 mils, preferably from about 4 to about 40 mils, more preferably from about 5 to about 35 mils, and most preferably from about 5 to about 25 mils. Furthermore, if such strips are applied, they should be placed on top of the backing sheet prior to the placement of the carpet pile if the width of such strips, as measured from the border of the sheet, is greater then the width of the area from the border to the carpet pile, in order to permit overlap of the strips and the carpet pile while simultaneously permitting adhesion of the strips to the sheet.

Furthermore, a significant problem exists within this field concerning the deterioration of the carbon-carbon double bonds in the matrix of the rubber backing sheet due to the exposure of the sheets to an oxidizing environment during use and cleaning. Specifically, the exposure of the mats to oxidizing agents during the washing and drying process tends to cleave the carbon-carbon double bonds of the rubber sheet thereby substantially embrittling the rubber which leads to cracking under the stress of use. In addition to the laundering process, the exposure of the mats to oxygen and ozone, either atmospheric or generated, during storage and use leads to cracking over time. The mat of the present invention may thus include an ozone-resistance additive, such as ethylene-propylene-diene monomer rubber (EPDM), as taught within U.S. Pat. No. 5,902,662, to Kerr, which provides enhanced protection to the rubber backing sheet against oxygen in order to substantially prolong the useful life of the mat. Such an additive also appears to provide a reduction in staining ability of such rubber backed mats upon contact with various surfaces, such as concrete, wood, and a handler's skin, just to name a few, as discussed in U.S. patent application Ser. No. 09/113,842 to Rockwell, Jr.

U.S. Pat. No. 5,305,565, to Nagahama et al., previously entirely incorporated by reference, shows the usual manner of producing floor mats comprising carpet pile fibers, a carpet pile substrate, and a rubber backing sheet. This reference, however, makes no mention as to the production of at least one integrated rubber protrusion from the side of the backing sheet opposite the carpet pile component. The term "integrated rubber protrusion" is intended to encompass any type of protrusion from the rubber backing sheet which is formed from the same backing sheet composition and is not attached in any manner to the resultant backing sheet after vulcanization. Thus, such a protrusion would be produced through the flowing of the rubber composition during vulcanization and allowing molten rubber to form around a die mold in a position in which it remains until it cures and sets. The shape of such a protrusion is virtually limitless, and may be of any size. Furthermore, it is possible to construct sheet wherein the body of the structure comprises a blowing agent (to produce a foam rubber) and a second layer of solid rubber covers the body portion. In such a manner, the protrusions could be formed with a core of foam rubber and a cap of solid rubber (upon vulcanization through a die-mold, for example). As such, preferably the protrusion or protrusions are formed from all foam rubber (which provides better cushioning). The separate protrusions thus provide discrete areas of relaxed stress within the inventive mat which thus provides a cushioning effect to a pedestrian, greater than for an overall flat foam rubber structure.

As noted previously, since the protrusion or protrusions are both located on the bottom side of the backing sheet and extend from the sheet itself, such a protrusion or protrusions provides a non-slip character to the overall mat structure. Since the length of the protrusions cannot be greater than the depth of the backing sheet itself (since it is vulcanized on a solid surface, the resultant protrusions are formed through the embedding of the die-mold within the backing sheet during vulcanization; removed portions of the die provide the holes in which the protrusions are ultimately formed from molten, then cooled rubber), such protrusions, being separate from the body of the mat through some type of shaft (again of any size and shape), form "feet" which can grip the surface on which the mat is placed and create difficulty in moving the mat through a pushing motion parallel to such a surface. Thus, the protrusions also provide a non-slip characteristic to the inventive mat. Again, as noted above, there has been no teaching or fair suggestion of such an advantage (in cost, at least) for an aesthetically pleasing carpeted dust control mat.

With regard to the die, it may be constructed of any material which can withstand vulcanization temperatures (i.e., between about 250° F. and about 350° F.) and pressures (i.e., between about 15 psi and 50 psi, generally). Thus, any metal may be utilized, certain plastics, such as Teflon®, for example, silicon molds, and the like. Preferably, the die is made of steel, is generally square or rectangular in shape (although any shape may be utilized), and comprises holes throughout to ultimately form the desired protrusions. Preferably, such holes are circular in shape (at the die surface) and cylindrical as well (i.e., circular on both surfaces with the same shape throughout the die from one surface to the other). Furthermore, such a die may also be utilized in an in-line process wherein there is no need to hand place the backing sheet over the die itself. The preferred procedure is outlined more particularly below.

The inventive mat provides a long-lasting non-slip, cushioned carpeted article which provides comfort to users as well as significantly reduced chances of slipping, all in a one-step procedure. All of this translates into reduced cost for the consumer as costs to produce are lower and possible medical and insurance costs may also be reduced with the utilization of such specific mats which also work to remove dirt and moisture from pedestrians' footwear.

BRIEF DESCRIPTION OF THE DRAWINGS

FIG. 1 is a schematic representation of a floor mat manufacturing machine with the inventive process ongoing.

FIG. 2 is an aerial view of the components of the inventive dust control mat placed together prior to vulcanization.

FIG. 3 is an aerial view of the preferred die.

FIG. 4 is a cross-sectional view of the inventive dust control mat after vulcanization.

DETAILED DESCRIPTION OF THE DRAWINGS

While the invention will be described in connection with certain preferred embodiments and practices, it is to be understood that it is not intended to in any way limit the invention to such embodiments and practices. On the contrary, it is intended to cover all alternatives, modifications and equivalents as may be included within the spirit and scope of the invention as defined by the appended claims.

Turning now to the drawings wherein like elements are designated by like reference numerals in the various views, FIG. 1 shows a floor mat manufacturing machine 10 for producing the inventive dust control mat 24. The machine 10 comprises a conveyor belt 11 which carries the mat components 14, 16, 18, 20 from an initial placement area 12 (where each component is placed in sequence) through a vulcanization chamber 22 and to a removal area 26. Thus, a die 14 is first placed on the belt 11. On top of the die 14 is then placed a rubber sheet 16 which includes a blowing agent (preferably), followed by solid rubber strips 18 placed around the perimeter of the first rubber sheet 16. These strips are the same length as each of the sides of the first rubber sheet 16 and are each preferably about 2 to 4 inches in width. The first rubber sheet 16 has a thickness of about 40 mils and the solid rubber strips 18, being much thinner, has a thickness of about 2.5 mils. To this die/rubber composite 13 is then placed a carpet pile through a carrier fabric 20. The resultant combination is then moved into the vulcanization chamber 22, which includes a heated press (not illustrated) to subject the mat components to a temperature of about 290° C. and a pressure of about 30 psi. After vulcanization, the finished mat 24 is allowed to cool and can then be removed from the die 14. This entire procedure or only portions thereof may be performed in an in-line process, such as in U.S. Pat. Nos. 5,928,446 and 5,932,317, both to Kerr et al.

FIG. 2 gives a greater detailed view of the die/rubber composite 13 as well as a cut-away view of the carpet pile 20 added on top of the composite 13. On top of the die 14 is placed the first rubber sheet 16 (including a blowing agent to form a foam rubber ultimately). The solid rubber strips 18 are placed around the perimeter of the first rubber sheet 16, leaving some overlap of the carpet pile 20 once that component is placed on top of the first rubber sheet 16 and a portion of the rubber strips 18.

The preferred die 14 is more thoroughly depicted in FIG. 3. The die is preferably about 2 inches tall and made of steel. Any material may be used for this die 14 as long as it can withstand vulcanization temperatures and pressures without distorting its shape or permanently adhering to the mat product (24 of FIG. 1) (such as, as merely examples, other metals like titanium, aluminum, and the like; fibers, such as polyaramid structures, and the like; silicon molds; and ceramics). The preferred die 14 comprises a plurality of cut-outs 28 which are, again preferably, circular in shape, and thus cylindrical in configuration, having a diameter of about 1 inch and a depth of 2 inches. It is through these holes 28 that the rubber composition of the first rubber sheet (16 of FIG. 2) is pressed to ultimately form the desired protrusions (34 of FIG. 4) on the bottom side of the preferred mat (24 of FIG. 1).

FIG. 4 thus shows a cross-section of a portion of the finished inventive dust control mat 24. Protrusions 34 have been formed comprising foam rubber from the first rubber sheet 16. The rubber strip 18 has been adhered to the first rubber sheet 16 and the carpet pile component 20, comprised of cut pile fibers 32 and a carrier fabric 30, have become adhered to both the first rubber sheet 16 and the rubber strip 18. The resultant preferred protrusions 34 are each about 1 inch in diameter and about 2 inches in length.

DETAILED DESCRIPTION OF THE INVENTION

As previously indicated, in the preferred embodiment of the present invention the base material for the first rubber backing sheet is acrylonitrile-butadiene rubber (NBR) or styrene-butadiene rubber (SBR). Other materials which may also be used include, by way of example, hydrogenated NBR, carboxylated NBR, EPDM, and generally any other standard types of rubbers which may be formed in a foam state. As will be appreciated, the use of NBR or SBR is desirable from a cost perspective.

The present invention makes use of the addition of chemical blowing agents to the rubber materials ultimately yielding a lighter rubber sheet. Specifically, in the preferred embodiment, the rubber backing sheet of the present invention comprises either NBR or SBR or both mixed with a blowing agent. The rubber/blowing agent mixture is thereafter calendared as a solid sheet of unvulcanized material which is used in the manufacture of the floor covering article in the process as described above. In practice, the raw NBR is believed to be available from Miles Inc. Rubber Division in Akron, Ohio. The SBR may be purchased from Goodyear Tire and Rubber Company in Akron, Ohio. EPDM may also be added in a preferred embodiment to provide ozone resistance.

In the preferred practice of the present invention, a masterbatch of the polymer components is first prepared by mixing the base rubber (either NBR or SBR) with the additive ozone resistant polymer (EPDM) in the desired ratio along with various stabilizers and processing agents. Exemplary compositions of the masterbatch for various additive ratios wherein EPDM is mixed with NBR are provided in Table 1A for ratios of NBR to the additive polymer of 9.0 (Column a), 2.3 (Column b) and 1.2 (Column c).

TABLE 1A

| MATERIAL | PARTS BY WEIGHT | | |
|---|---|---|---|
| | a | b | c |
| Rubber (NBR) | 40 | 25 | 50 |
| Additive Rubber (EPDM) | 60 | 75 | 50 |
| Plasticizer | 10 | 5 | 15 |
| Stabilizer | 2 | 2 | 2 |
| Processing Aid | 1.75 | 1.75 | 1.75 |
| Antioxidant | 1.2 | 1.2 | 1.2 |

In the preferred practice the plasticizer which is used is diisononylphthalate. The stabilizer is trinonylphenolphosphate available from Uniroyal Chemical under the trade designation Polyguard™. The processing aid is purchased from the R.T. Vanderbilt Company in Norwalk Conn. under the trade designation Vanfree™ AP-2. The antioxidant is purchased from Uniroyal Chemical under the trade designation Octamine™.

Following the mixing of the masterbatch, curative agents are added in a second stage mixing process for formation of the raw rubber compound which forms the backing sheet of the floor covering article of the present invention. An exemplary composition of the raw rubber compound formed in this second stage mixing process is provided in Table 1B.

TABLE 1B

| MATERIAL | PARTS BY WEIGHT |
|---|---|
| Masterbatch Blend | 100 |
| Sulfur | 1.25 |
| Stearic Acid | 1 |
| Carbon Black N-550 | 40 |
| Vulkacit Thiaram MS (TMTM) | 0.5 |
| Zinc Oxide | 5 |
| Blowing Agent | 2.5 |

Exemplary compositions of the masterbatch for various additive ratios of SBR to EPDM are provided in Table 2A in a manner similar to that of Table 1A.

TABLE 2A

| MATERIAL | PARTS BY WEIGHT | | |
|---|---|---|---|
| | a | b | c |
| Rubber (SBR) | 40 | 25 | 50 |
| Additive Polymer (EPDM) | 60 | 75 | 50 |
| Stearic Acid | 1 | 1 | 1 |
| Sunolite 240 | 2 | 2 | 2 |
| Zinc Oxide | 5 | 5 | 5 |
| Carbon Black N-550 | 30 | 30 | 30 |
| Carbon Black N-224 | 60 | 60 | 60 |
| Calcium Carbonate | 35 | 35 | 35 |
| Talc | 30 | 30 | 30 |
| Supar 2280 | 80 | 80 | 80 |

After mixing of the SBR masterbatch, curative agents are preferably added in a second stage mixing process for formation of the raw rubber compound which forms the backing sheet of the floor covering article of the present invention. An exemplary composition of the raw rubber compound formed in this second stage mixing process is provided in Table 2B.

TABLE 2B

| MATERIAL | PARTS BY WEIGHT |
|---|---|
| Masterbatch Blend | 100 |
| Sulfur | 2 |
| Methyl Zimate | 1.25 |
| Butyl Zimate | 1.25 |
| Dibutyl Thiurea | 2.50 |
| Tellurium Diethyldithiocarbanate | 1 |
| Blowing Agent | 2.0 |

As previously indicated and shown above, the rubber backing sheet includes a blowing agent to effectuate the formation of closed gas cells in the rubber during vulcanization. The blowing agent which is preferably used is a nitrogen compound organic type agent which is stable at normal storage and mixing temperatures but which undergoes controllable gas evolution at reasonably well defined decomposition temperatures. By way of example only and not limitation, blowing agents which may be used include: azodicarbonamide (Celogen™ AZ-type blowing agents) available from Uniroyal Chemical Inc. in Middlebury Conn. and modified azodicarbonamide available from Miles Chemical in Akron, Ohio under the trade designation Poroför™ ADC-K.

It has been found that the addition of such blowing agents at a level of between about 1 and about 5 parts by weight in the raw rubber composition yields a rubber sheet having an expansion factor of between about 50 and 200 percent. After the fluxing processes are completed, the uncured rubber compound containing EPDM and the blowing agent is assembled with the pile yarns and carrier layer as previously described. The vulcanization of the rubber backing sheet is then at least partially effected within the press molding apparatus wherein the applied pressure is between 20 and 40 psi. Under the high temperatures and pressure, the nitrogen which is formed by the blowing agent partly dissolves in the rubber. Due to the high internal gas pressure, small closed gas cells are formed within the structure as the pressure is relieved upon exit from the press molding apparatus. In an alternative practice a post cure oven may be used to complete the vulcanization of the mat and provide additional stability to the resulting product.

EXAMPLE

A rubber sheet material was produced by fluxing together the materials as set forth in Table 1A in a standard rubber internal mixer at a temperature of about 280° F. to 300° F. for a period of one to two minutes. EPDM additions were varied as shown in Table 1A to yield ratios of EPDM to NBR of 3.0 (75 parts EPDM to 25 parts NBR); 1.5 (60 parts EPDM to 40 parts NBR); and 1.0 (50 parts EPDM to 50 parts NBR). Additions of curative agents as provided in Table 1B were then made. An Uncured sheet of the fluxed rubber compounds was then calendared, placed over a die mold having a plurality of cylindrically configured openings, covered partially with a pile fabric component (attached to a carrier fabric) and cured at a temperature of about 290° F. for five (5) minutes under a pressure of about 40 psi and post cured at a temperature of about 290° F. at atmospheric pressure for a period of five (5) minutes. The resultant floor covering article provided a significant amount of increased cushioning as compared to a sample article prepared without the utilization of the die mold but with the same rubber composition and pile fabric covering and under the same conditions as the inventive mat. Furthermore, the inventive mat, when placed on a floor with the resultant foam rubber protrusions in contact with the floor exhibited a substantial reduction in slip capability as compared with the standard non-cleated foam rubber sample produced without the use of the die molding vessel did not exhibit any appreciable carbon staining from the rubber backing sheet.

While the invention has been described and disclosed in connection with certain preferred embodiments and procedures, these have by no means been intended to limit the invention to such specific embodiments and procedures. Rather, the invention is intended to cover all such alternative embodiments, procedures, and modifications thereto as may fall within the true spirit and scope of the invention as defined and limited only by the appended claims.

What is claimed is:

1. A cushioned floor covering article comprising, as a single unitary article,
   a carrier fabric;
   a pile material tufted into the carrier fabric which forms a pile surface on one side of the carrier fabric; and
   a vulcanized expanded backing sheet comprised of foam rubber attached to the other side of the carrier fabric, wherein at least one integrated protrusion comprised of a foam rubber cap and said backing sheet is present on the one side of the backing opposite the side to which the carrier fabric is attached and wherein said at least one integrated protrusion is comprised of a foam rubber cap.

2. The floor covering article of claim 1 wherein said at least one protrusion integrated within said backing sheet is substantially cylindrical in shape.

3. The floor covering article of claim 1 wherein a plurality of protrusions integrated within said backing sheet is present.

4. The floor covering article of claim 1 further comprising at least one solid rubber reinforcing strip around the border edges of the side of the backing sheet attached to said carrier fabric.

5. The floor covering article of claim 1 wherein said pile fabric comprises yarns selected from the group consisting of nylon, polyester, cotton, wool, and any blends thereof.

6. The floor covering article of claim 5 wherein said pile fabric comprises solution-dyed nylon.

7. The floor covering article of claim 1 wherein said carrier fabric is selected from the group of fabric materials consisting of woven fabrics, non-woven fabrics, and knit fabrics.

8. The floor covering article of claim 7 wherein said carrier fabric is a woven material.

9. The floor covering article of claim 7 wherein said carrier fabric is a non-woven material.

* * * * *